(12) United States Patent
Kawasaki et al.

(10) Patent No.: US 11,967,137 B2
(45) Date of Patent: Apr. 23, 2024

(54) OBJECT DETECTION CONSIDERING TENDENCY OF OBJECT LOCATION

(71) Applicant: INTERNATIONAL BUSINESS MACHINES CORPORATION, Armonk, NY (US)

(72) Inventors: Hiroki Kawasaki, Kanagawa (JP); Shingo Nagai, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 389 days.

(21) Appl. No.: 17/457,264

(22) Filed: Dec. 2, 2021

(65) Prior Publication Data

US 2023/0177813 A1  Jun. 8, 2023

(51) Int. Cl.
*G06V 10/00* (2022.01)
*G06T 7/70* (2017.01)
(Continued)

(52) U.S. Cl.
CPC .............. *G06V 10/776* (2022.01); *G06T 7/70* (2017.01); *G06V 10/764* (2022.01); *G06V 10/774* (2022.01); *G06T 2207/20081* (2013.01)

(58) Field of Classification Search
CPC .. G06V 10/776; G06V 10/764; G06V 10/774; G06V 10/25; G06V 10/82;
(Continued)

(56) References Cited

U.S. PATENT DOCUMENTS 8,953,888 B2   2/2015 Kohli
10,776,639 B2  9/2020 Steinberg
(Continued)

FOREIGN PATENT DOCUMENTS

CN   109711463 A   5/2019
CN   109741332 A   5/2019
(Continued)

OTHER PUBLICATIONS

"Patent Cooperation Treaty PCT International Search Report", Applicant's File Reference: P202105123, International Application No. PCT/IB2022/061440, International Filing Date: Nov. 25, 2022, dated Mar. 15, 2023, 8 pages.
(Continued)

*Primary Examiner* — Ping Y Hsieh
(74) *Attorney, Agent, or Firm* — Anthony M. Pallone (57) ABSTRACT

According to one embodiment, a method, computer system, and computer program product for object detection. The embodiment may include receiving an annotated image dataset comprising rectangles which surround objects to be detected and labels which specify a class to which an object belongs. The embodiment may include calculating areas of high and low probability of rectangle distribution for each class of objects within images of the dataset. The embodiment may include applying a correction factor to confidence values of object prediction results, obtained during validation of a trained object detection (OD) model, depending on a class label and a rectangle location of an object prediction result and calculating an accuracy of the trained OD model. The embodiment may include increasing the correction factor and re-calculating the accuracy of the trained OD model with every increase. The embodiment may include selecting an optimal correction factor which yields a highest accuracy.

20 Claims, 5 Drawing Sheets

(51) Int. Cl.
  *G06V 10/764* (2022.01)
  *G06V 10/774* (2022.01)
  *G06V 10/776* (2022.01)

(58) Field of Classification Search
  CPC ........ G06V 10/993; G06V 20/00; G06T 7/70;
  G06T 2207/20081; G06T 2207/20084;
  G06T 7/73
  See application file for complete search history.

(56) References Cited

U.S. PATENT DOCUMENTS

| | | |
|---|---|---|
| 10,810,456 B2 | 10/2020 | Piekniewski |
| 2012/0207346 A1 | 8/2012 | Kohli |
| 2016/0086052 A1 | 3/2016 | Piekniewski |
| 2016/0210525 A1 | 7/2016 | Yang |
| 2017/0061252 A1 | 3/2017 | Burgos |
| 2019/0065908 A1* | 2/2019 | Lee ............... G06F 18/2155 |
| 2019/0258878 A1 | 8/2019 | Koivisto |
| 2020/0193225 A1 | 6/2020 | Olmeda Reino |
| 2021/0286997 A1 | 9/2021 | Lee |
| 2022/0187841 A1* | 6/2022 | Ebrahimi Afrouzi ................ G05D 1/0274 |

FOREIGN PATENT DOCUMENTS

| | | |
|---|---|---|
| CN | 110414307 A | 11/2019 |
| JP | 4946228 B2 | 3/2012 |

OTHER PUBLICATIONS

Kamiya et al., "A Novel Scene Context Descriptor for Improving Object Detection Performance," Graduate School of Information Science, Nagoya, 2009, Universityhttps://www.murase.m.is.nagoya-u.ac.jp/~ide/res/paper/J09-symposium-kamiya-1.pdf, 8 pages (Abstract Only).

Li et al., "A New Benchmark for Vison-Based Cyclist Detection," 2016 IEEE Intelligent Vehicles Symposium (IV), Gothenburg, Sweden, Jun. 19-22, 2016, pp. 1109-1114.

Li et al., "Tsinghua-Daimler Cyclist Detection Benchmark," Gavrila, Accessed: Oct. 7, 2021, Retrieved from the Internet: http://www.gavrila.net/Datasets/Daimler_Pedestrian_Benchmark_D/Tsinghua-Daimler_Cyclist_Detec/tsinghua-daimler_cyclist_detec.html, 2 pages.

Mell et al., "The NIST Definition of Cloud Computing", National Institute of Standards and Technology, Special Publication 800-145, Sep. 2011, 7 pages.

Miidas Datascience Team, "Miidas Research," Accessed: Oct. 12, 2021, Retrieved from the Internet: https://research.miidas.jp/, 2 pages.

* cited by examiner

OBJECT DETECTION CONSIDERING TENDENCY OF OBJECT LOCATION

BACKGROUND

The present invention relates generally to the field of computing, and more particularly to object detection.

Object detection (OD) is a computer technology related to computer vision and image processing that is used to detect instances of visual objects of certain classes (e.g., humans, cars, buildings, animals) in digital images such as photos or video frames. As a key field in artificial intelligence and deep learning, OD allows computer systems to see their environments by detecting objects and labeling them with a classification (i.e., inferring a class to which the object belongs). Advances in OD algorithms, for example, Faster Region-Based Convolutional Neural Network (Faster R-CNN), Single Shot Detector (SSD), and You Only Look Once (YOLO), as well as advances in computing hardware (e.g., imaging technology, central/graphics processing units) have rapidly improved the accuracy and inference speeds of OD technologies. Although the detection logic of OD algorithms may differ, all of them allow a user to identify the objects to be detected within rectangles, called bounding boxes, and specify, for each rectangle, the class to which the object belongs before training an OD model.

SUMMARY

According to one embodiment, a method, computer system, and computer program product for object detection. The embodiment may include receiving an annotated image dataset comprising rectangles which surround objects to be detected and labels which specify a class to which an object belongs. The embodiment may include calculating areas of high and low probability of rectangle distribution for each class of objects within images of the dataset. The embodiment may include applying a correction factor to confidence values of object prediction results, obtained during validation of a trained object detection (OD) model, depending on a class label and a rectangle location of an object prediction result. The embodiment may include calculating an accuracy of the trained OD model. The embodiment may include increasing the correction factor and re-calculating the accuracy of the trained OD model with every increase. The embodiment may include selecting an optimal correction factor which yields a highest accuracy.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

The present invention relates generally to the field of computing, and more particularly to object detection. The following described exemplary embodiments provide a system, method, and program product to, among other things, calculate tendency/likelihoods of rectangle location (i.e., areas of high and low distribution of object location) within training images for an object detection model and, accordingly, utilize the calculated likelihoods of rectangle location during inference with the trained object detection model. Therefore, the present embodiment has the capacity to improve the technical field of object detection by dynamically suppressing both over-detection and over-looking of objects during inference, thus improving the accuracy of an object detection model.

As previously described, OD is a computer technology related to computer vision and image processing that is used to detect instances of visual objects of certain classes (e.g., humans, cars, buildings, animals) in digital images such as photos or video frames. As a key field in artificial intelligence and deep learning, OD allows computer systems to see their environments by detecting objects and labeling them with a classification (i.e., inferring a class to which the object belongs). Advances in OD algorithms, for example, Faster R-CNN, SSD, and YOLO, as well as advances in computing hardware (e.g., imaging technology, central/graphics processing units) have rapidly improved the accuracy and inference speeds of OD technologies. Although the detection logic of OD algorithms may differ, all of them allow a user to identify the objects to be detected within rectangles, called bounding boxes, and specify, for each rectangle, the class to which the object belongs before training an OD model. During training, the OD model learns the location of the rectangles and the classes to which the rectangles belong from the training images, and during inference, the OD model outputs prediction results having rectangles representing detected objects and corresponding labels of classes to which they belong based on information of the inferred images. The OD model also outputs a confidence value for each prediction and label. The confidence value must be above a threshold of certainty in order for the OD model to count a predicted object as a true positive detection result and is usually expressed as a continuous value between 0 and 1. However, current OD algorithms do not consider the tendency of rectangle locations within images both during training of an OD model and inference with the trained OD model, and therefore, even if a strong tendency of rectangle locations is observed during training that an object is less likely to be detected in some areas of the training image and more likely to be detected in other areas of the training image, the observed tendency cannot be utilized for inference.

Although there may be no bias in the locations where objects are detected within images during inference, objects are sometimes more likely to be detected at locations where they are often found in the training images. In such a case, calculating the location distribution of the objects (i.e., the tendency of rectangle locations) in the training images and utilizing the calculated location distribution for inference is thought to suppress both over-detection, in which the object is detected in locations where it could never be detected (i.e., an area with low probability of object appearance), and over-looking, in which the object is detected with a low confidence value despite being in a location where it is highly likely to be detected (i.e., an area with high probability of object appearance). For example, by utilizing the calculated location distribution of the objects (i.e., areas of high and low probability of object appearance), if an object of a certain class (e.g., a car) is detected with a low confidence value in an area with high probability of car appearance, the confidence value is increased. Conversely, if an object that looks like a car is mistakenly detected as a car in an area with low probability of object appearance, its confidence value is decreased. As another example, in a situation where an OD model detects multiple classes of objects and there are two classes of objects that are similar in appearance, the OD model may confuse the classes to which the rectangles belong even though the location of the rectangle can be correctly detected during inference. In such a situation, if we know the tendency of rectangle location of each object class, we can refer to that tendency of rectangle location to help the OD model classify multiple classes of objects with less confusion.

However, there are several concerns when referring to the tendency of rectangle location representing objects in the training images during inference. For instance, how much consideration to be given to the tendency of rectangle location of objects depends on the type of the images. Over-referencing of the tendency of rectangle location may lead to over-detection or to over-looking. Therefore, it is necessary to automatically search for the appropriate degree of reference to the tendency of rectangle location of objects while training an OD model, rather than having a user decide the degree of it. It may therefore be imperative to have a system in place to identify, within training images, areas of high and low probability of object appearance for a given class when training an OD model and utilize information of those identified areas during inference with the trained OD model. Thus, embodiments of the present invention may be advantageous to, among other things, calculating areas of high and low likelihood of rectangle distribution for objects of a given class when training an OD model, applying adjustment coefficients/correction factors to confidence values of detection results obtained with the trained OD model based on the areas of high and low likelihood of rectangle distribution, varying applied adjustment coefficients to identify an optimum adjustment coefficient value for the class, and improving inference accuracy of the OD model. The present invention does not require that all advantages need to be incorporated into every embodiment of the invention.

According to at least one embodiment, when training an OD model, a prepared image dataset having labeled position data (e.g., bounding boxes) and labeled class types may be received and, for each class type, areas of high and low probability of object appearance may be calculated. The trained OD model may be applied to validation data and, for each detection result (i.e., an inference), an associated confidence value of the detection may be adjusted depending on the object result being within an area of high or low probability of object appearance for the object class. The amount of adjustment may be varied in order to identify an optimum adjustment value which yields a highest detection accuracy of the OD model. The trained OD model, the areas of high and low probability of object appearance for each class, and the optimum adjustment value may be deployed into a production environment. According to a further embodiment, aspects of the present invention may be incorporated as post-processing to improve accuracy of an OD model already in use without the need for retraining.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to identify, for one or more classes of objects, areas of high and low probability of object detection location within an image and apply an adjustment coefficient/correction factor to confidence values of object detections based on their locations within the image. Furthermore, the system, method, and program product additionally determine an optimal adjustment coefficient.

Figure 1:
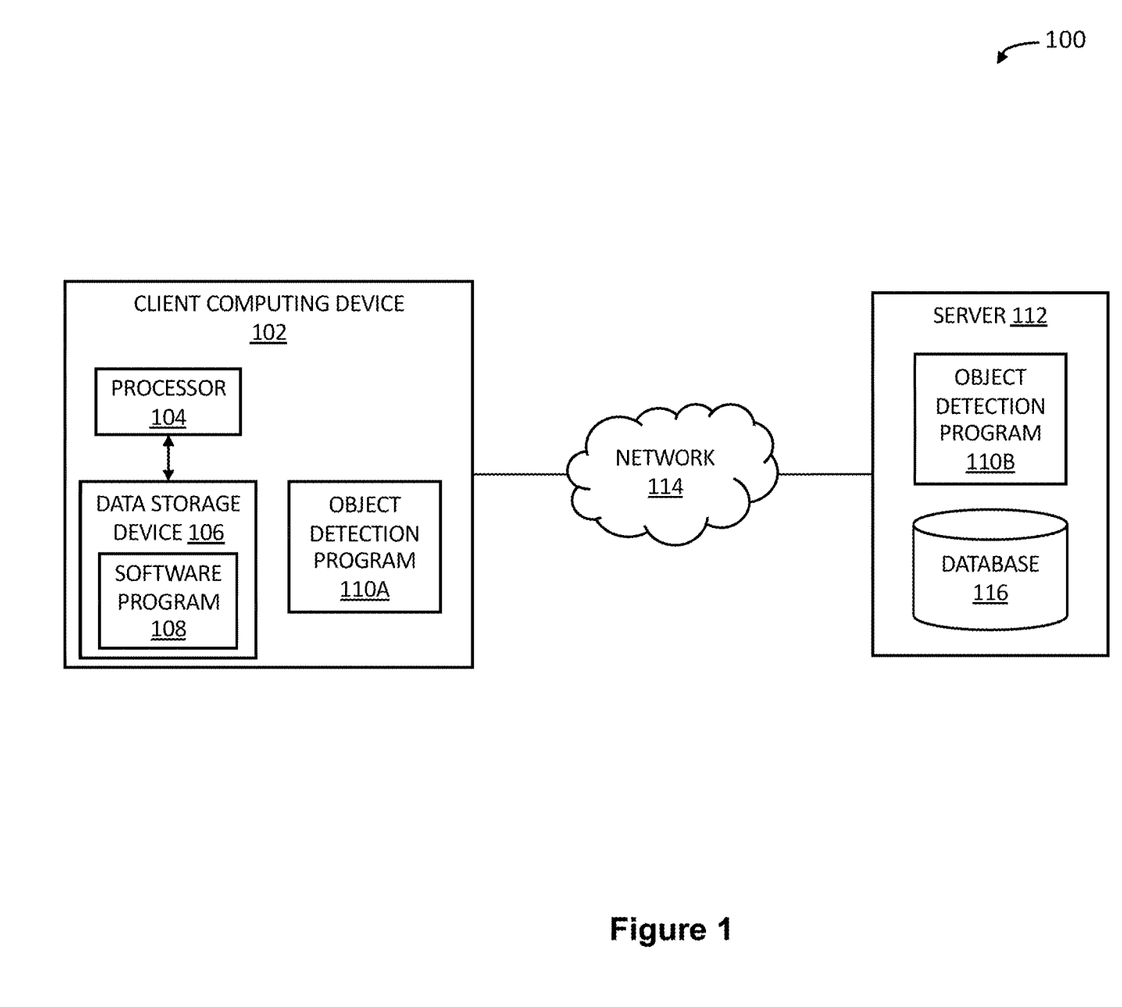
FIG. 1 illustrates an exemplary networked computer environment according to at least one embodiment.

Referring to FIG. 1, an exemplary networked computer environment 100 is depicted, according to at least one embodiment. The networked computer environment 100 may include a client computing device 102 and a server 112, interconnected via a communication network 114. According to at least one implementation, the networked computer environment 100 may include a plurality of client computing devices 102 and servers 112, of which only one of each is shown for illustrative brevity. Additionally, in one or more embodiments, the client computing device 102 and the server 112 may each host an object detection program 110A, 110B. In one or more other embodiments, the object detection program 110A, 110B may be partially hosted on client computing device 102 and server 112 so that functionality may be separated among the devices.

The communication network 114 may include various types of communication networks, such as a wide area network (WAN), local area network (LAN), a telecommunication network, a wireless network, a public switched network and/or a satellite network. The communication network 114 may include connections, such as wired or wireless communication links or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and an object detection program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running an object detection program 110B and a database 116 and communicating with the client computing device 102 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the object detection program 110A, 110B may be a program capable of analyzing an image dataset annotated with bounding box positions and class labels for objects, identifying, for each class of objects, an area of high probability/likelihood of object appearance (i.e., bounding box location) and an area of low probability/likelihood of object appearance based on annotations of the image dataset, training an OD model on training images of the image dataset using known OD algorithms, applying the trained OD model to validation images of the image dataset, adjusting confidence values of object detection results via a correction factor based on class and identified areas of high and low probability/likelihood of object appearance, assessing an accuracy of the OD model using user defined parameters, varying the correction factor according a pre-defined range and re-assessing OD model accuracy with each variation, identifying an optimum correction factor which corresponds to a highest assessed accuracy of the OD model, and deploying the trained OD model, the identified areas of high and low probability/likelihood of object appearance, and the optimum correction factor into a production environment. The object detection method is explained in further detail below with respect to FIG. 2.

Figure 2:
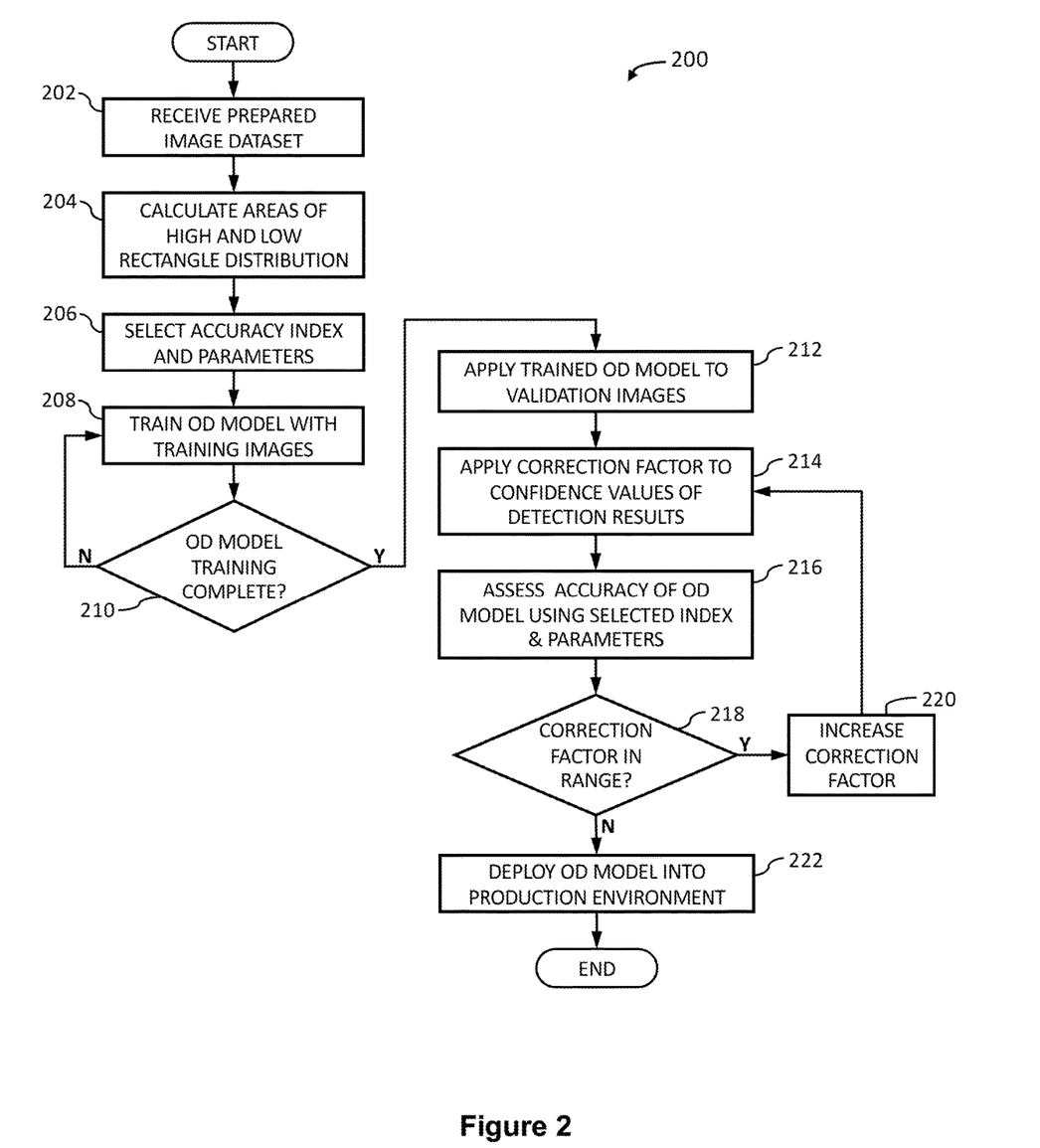
FIG. 2 illustrates an operational flowchart for object detection utilizing tendency of bounding box location in an object detection model training and deployment process according to at least one embodiment.

Referring now to FIG. 2, an operational flowchart for object detection utilizing tendency of bounding box location in an object detection model training and deployment process 200 is depicted according to at least one embodiment. At 202, the object detection (OD) program 110A, 110B receives a prepared dataset of digital images. The dataset is prepared in that the digital images include bounding boxes (e.g., rectangles) surrounding objects to be detected within the images, and labels, for every object surrounded by a bounding box, which specify a detection class to which the object belongs. For example, the dataset may include a series of digital images captured by a stationary camera, and while the setting/background of the digital images may remain unchanged, the number and class of objects to be detected within each image may vary. The prepared dataset may be stored within data storage device 106 or database 116 and received from software program 108. According to at least one further embodiment, the OD program 110A, 110B may require a user to opt-in to system usage upon opening or installation of the OD program 110A, 110B.

Next, at 204, the OD program 110A, 110B calculates an area of high probability of rectangle distribution (i.e., high probability of object appearance) and an area of low probability of rectangle distribution (i.e., low probability of object appearance), within images of the dataset, for each detection class of the dataset. For each detection class, the OD program 110A, 110B analyzes rectangle location (e.g., center position pixel coordinates, rectangle height and width pixel information) and distribution within the digital images of the dataset and may base calculation of the high and low areas of rectangle distribution on center position coordination of rectangles. The areas of high and low probability of rectangle distribution may each include center position pixel coordinates and bounds which are defined by a range of pixels along an x and y axis. Although probability distribution is represented by values that are continuous along the positions of images, in embodiments of the present invention, only the area with particularly high likelihood of object appearance (i.e., the area containing a top percentage of rectangles) and the area with particularly low likelihood of object appearance (i.e., the area containing a bottom percentage of rectangles) within an image are determined for each class and used in the subsequent training and inference processes of the OD model. For example, the area of high probability of rectangle distribution may represent the top k % probability of object appearance and the area of low probability of rectangle distribution may represent the bottom k % probability of object appearance for a detection class.

At 206, the OD program 110A, 110B selects an accuracy index for later use in accessing an accuracy of the OD model. The OD program 110A, 110B may also receive user specified parameters to be used within the selected accuracy index. A weighted F-value may be used as the accuracy index. This index is a mixture of two types of accuracy indexes, precision and recall, with arbitrary weights as shown here in equation (1).

$$F_\beta = \frac{(1 + \beta^2) \times \text{precision} \times \text{recall}}{\beta^2 \times \text{precision} + \text{recall}} \quad (1)$$

A generalization of the accuracy index called F-value is shown here in equation (2).

$$F_1 = \frac{2}{1/\text{precision} + 1/\text{recall}} \quad (2)$$

Precision is the percentage of correctly detected objects of those detected by the OD model, and recall is the percentage of correctly detected objects by the OD model of the total correct objects. These two values may increase and decrease depending on a threshold of certainty of the OD model during inference. As mentioned above, a confidence value of a detection result during inference must be above the threshold of certainty in order to be counted as a true positive detection result by the OD model. In general, the threshold of certainty may be adjusted so that recall is maximized to suppress missing detection of objects, or the value of precision may be maximized to suppress over-detection of objects. However, increasing the threshold of certainty lowers recall and raises precision, meaning that precision and recall are inversely related. The F-value is an accuracy index which takes into consideration these two accuracy indices at the same time. In equation (2), precision and recall are considered (i.e., weighted) equally in the calculation. However, since the ratio between necessity of suppression of over-detection and that of missing detection (i.e., which of precision or recall is to be given more importance) may require adjustment depending on the system to be constructed or the method of operation, use of the weighted F-value shown in equation (1) allows the value of β to be adjusted to specify which of precision or recall is to be given more importance in assessing an accuracy of the OD model. In equation (1), β∈(0, 1) is adopted when precision is given more importance, β∈(1, ∞) is adopted when recall is given more importance, and β=1 is adopted when precision and recall must be treated equally so that the same equation as the F-value in equation (2) is obtained. In embodiments of the present invention, the value of β is selected by the user and used in the weighted F-value as an accuracy index of the OD model.

Next, at 208, the OD program 110A, 110B divides the prepared dataset of digital images into a training dataset and a validation dataset and trains the OD model, by a number of iterations, using the training dataset. Division of the prepared dataset into the training and validation datasets may be according to a user specified division ratio. The OD program 110A, 110B may utilize any known deep learning algorithm for object detection (e.g., Faster R-CNN, SSD, YOLO) when training the OD model using the training dataset.

At 210, the OD program 110A, 110B determines whether the number of iterations of training of the OD model using the training dataset is complete. In response to determining that the number of iterations of training of the OD model using the training dataset is complete (step 210, "Y" branch), the object detection model training and deployment process 200 may proceed to step 212. In response to determining that the number of iterations of training of the OD model using the training dataset is not complete (step 210, "N" branch), the object detection model training and deployment process 200 may return to step 208.

Next, at 212, the OD program 110A, 110B validates the trained OD model for accuracy by applying the model to digital images of the validation dataset (i.e., the trained OD model is used for inference). During the validation for accuracy, the OD model outputs prediction results of the inference performed by the trained OD model on the validation dataset. Each prediction result includes a rectangle representing a detected object, a label which specifies a class to which the detected object belongs, and a confidence value which is usually expressed as a continuous value between 0 and 1. The confidence value must be above a threshold of certainty in order for the trained OD model to count a predicted object as a true positive detection result.

At 214, the OD program 110A, 110B applies a current correction factor to confidence values of prediction results depending on a rectangle position and class label of a detection result. The correction factor may be a value within a pre-defined range (e.g., a value between, and including, 1 and 2). The OD program 110A, 110B may start with a beginning value of the pre-defined range (e.g., 1) as the value for the correction factor and later increase the correction factor along the pre-defined range in various increments. The class to which a detection result belongs to will be apparent from the class label of the detection result. As such, the OD program 110A, 110B identifies if the detection result is within the class specific area of high probability of rectangle distribution or the class specific area of low probability of rectangle distribution, based on a center pixel coordinate of the rectangle for the detection result, and applies the correction factor accordingly. For example, if the center pixel coordinate of the rectangle for the detection result is within the area of high probability of rectangle distribution for its class, the OD program 110A, 110B multiplies the original confidence value of the detection result by the correction factor (e.g., original confidence value*α, where α represents the correction factor). As another example, if the center pixel coordinate of the rectangle for the detection result is within the area of low probability of rectangle distribution for its class, the OD program 110A, 110B multiplies the original confidence value of the detection result by the reciprocal of the correction factor (e.g., original confidence value*1/α, where α represents the correction factor). As yet another example, if the center pixel coordinate of the rectangle for the detection result is not within either of the areas of high or low probability of rectangle distribution for its class, the OD program 110A, 110B does not apply a correction factor to the original confidence value of the detection result.

At 216, the OD program 110A, 110B calculates an accuracy of the trained OD model, with the currently applied correction factor, using the weighed F-value of equation (1) and the user selected value for β received at step 206. Where the correction factor is applied, the effect is that the confidence value for a detection result is either raised or lowered and thus may rise above or fall below the threshold of certainty which filters inference results. For example, in a scenario where a confidence value for a correctly detected object x, within an area of high probability of object x appearance, falls below the threshold of certainty and fails to be counted as a true positive detection result, the confidence value is increased so that it exceeds the threshold of certainty and is counted as a true positive detection result. Likewise, in a scenario where a confidence value for an incorrectly detected object x, within an area of low probability of object x appearance, exceeds the threshold of certainty, the confidence value is decreased so that it falls below the threshold of certainty and is not counted as a true positive detection result. Consequently, precision and recall accuracy indexes of the trained OD model are affected as the number of correctly detected objects changes with corrections to confidence values. Additionally, the OD program 110A, 110B records and stores the calculated accuracy for the trained OD model along with the corresponding currently applied correction factor within data storage device 106 or database 116.

Next, at 218, the OD program 110A, 110B determines whether or not the currently applied correction factor is still within the pre-defined range of values. In response to determining that the currently applied correction factor is still within the pre-defined range (step 218, "Y" branch), the object detection model training and deployment process 200 may proceed to step 220. In response to determining that the currently applied correction factor is no longer within the pre-defined range (step 218, "N" branch), the object detection model training and deployment process 200 may proceed to step 222.

At 220, the OD program 110A, 110B automatically increases the correction factor along the pre-defined range according to a pre-defined increment amount. For example, in a scenario where the pre-defined range of correction factor values is between 1 and 2, inclusive, and the applied correction factor started with a value of 1, the OD program 110A, 110B may automatically increase the correction factor by a 5% increment to a value of 1.05. The OD program 110A, 110B may later continue to increase the correction factor by 5% increments until it is determined that the correction factor is no longer within the pre-defined range of values.

At 222, the OD program 110A, 110B selects, from among the recorded accuracies of the trained OD model and their corresponding correction factors, the correction factor which yielded the highest recorded accuracy of the trained OD model. The selected correction factor may be referred to as the optimum correction factor for the trained OD model. Additionally, the OD program 110A, 110B deploys the trained OD model for use within a production environment along with the optimum correction factor for the trained OD model and the calculated areas of high and low probability of rectangle distribution for each class.

It may be appreciated that FIG. 2 provides only an illustration of one implementation and do not imply any limitations with regard to how different embodiments may be implemented. Many modifications to the depicted environments may be made based on design and implementation requirements.

Figure 3:
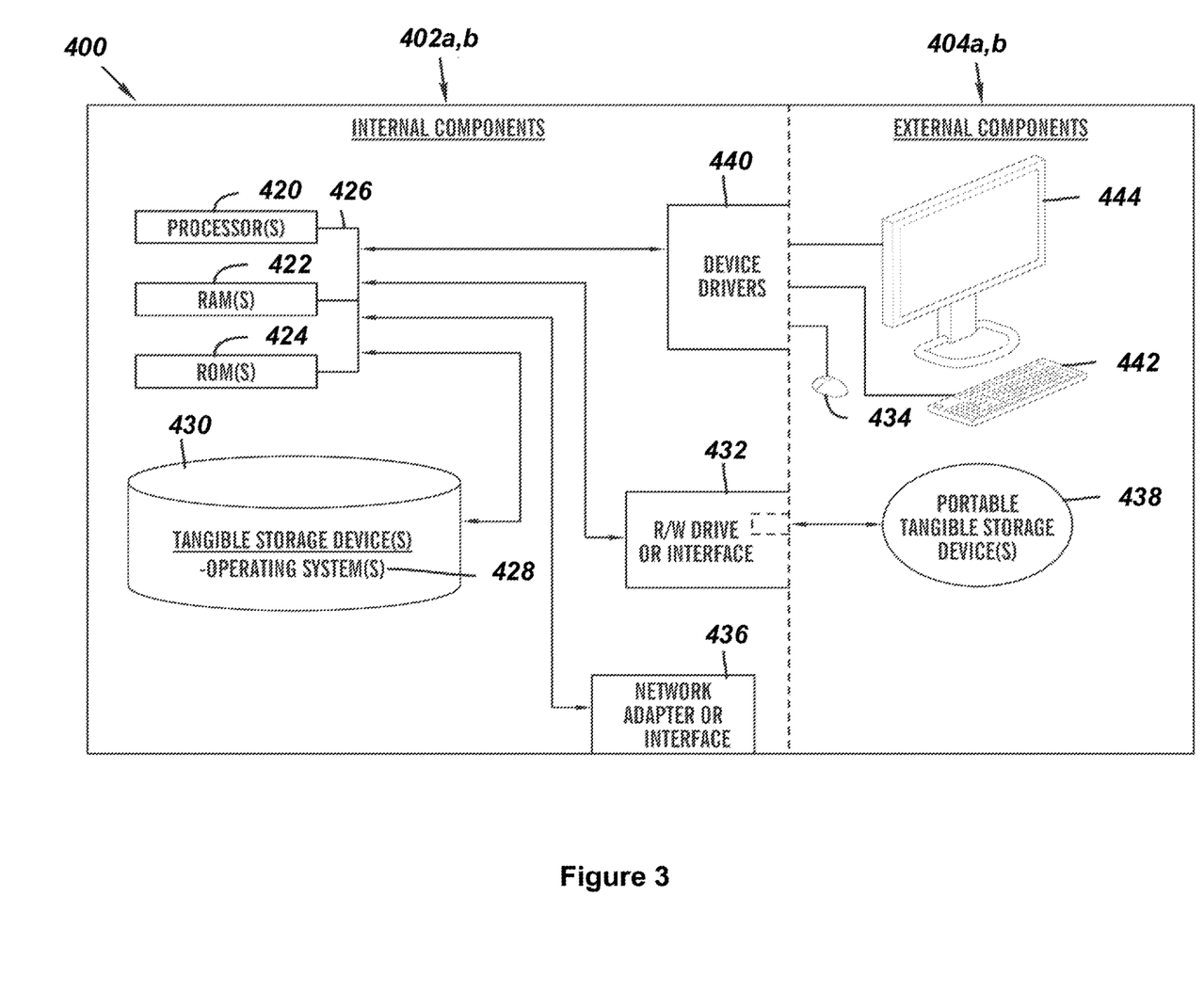
FIG. 3 is a functional block diagram of internal and external components of computers and servers depicted in FIG. 1 according to at least one embodiment.

FIG. 3 is a block diagram 400 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, IoT devices, and distributed cloud computing environments that include any of the above systems or devices.

The client computing device 102 and the server 112 may include respective sets of internal components 402 a,b and external components 404 a,b illustrated in FIG. 3. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the OD program 110A in the client computing device 102, and the OD program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 3, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes a RAY drive or interface 432 to read from and write to one or more portable computer-readable tangible storage devices 438 such as a CD-ROM, DVD, memory stick, magnetic tape, magnetic disk, optical disk or semiconductor storage device. A software program, such as the OD program 110A, 110B, can be stored on one or more of the respective portable computer-readable tangible storage devices 438, read via the respective R/W drive or interface 432, and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The software program 108 and the OD program 110A in the client computing device 102 and the OD program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the OD program 110A in the client computing device 102 and the OD program 110B in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
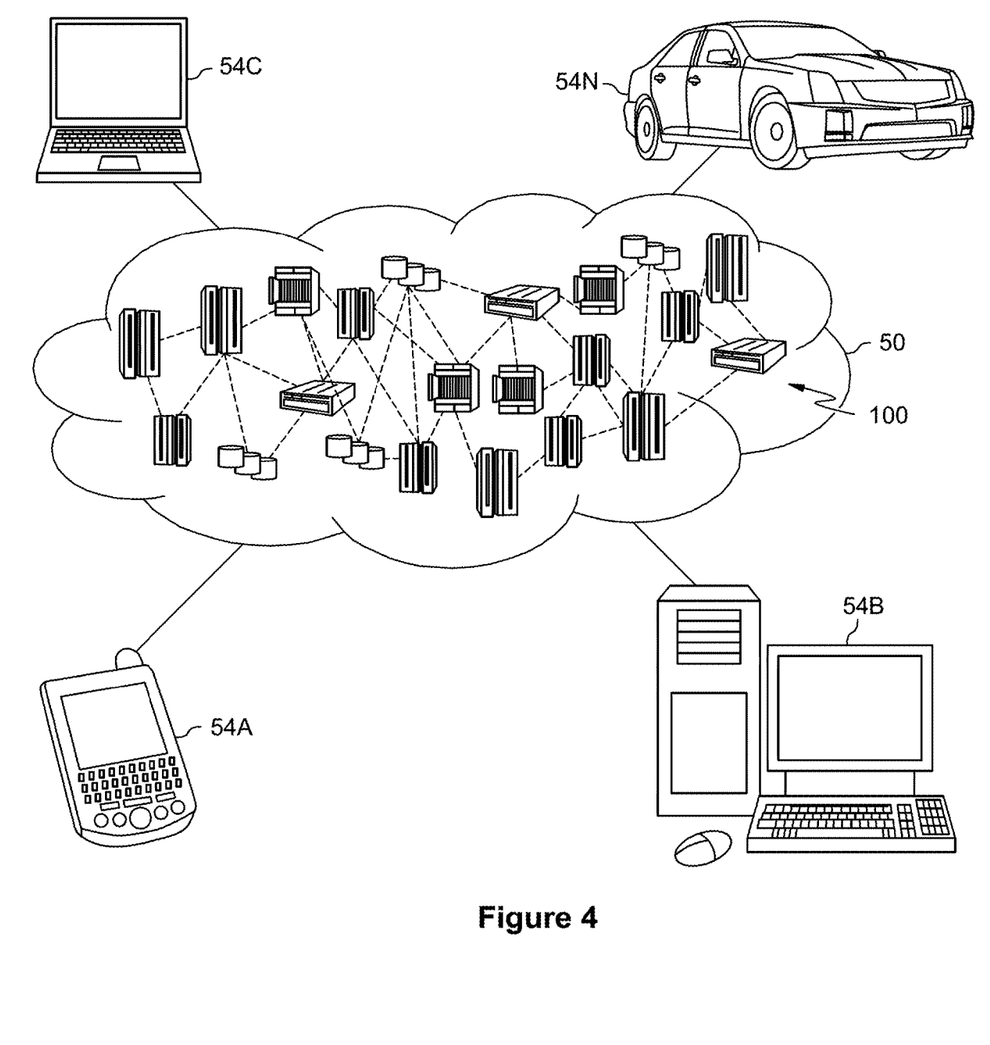
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
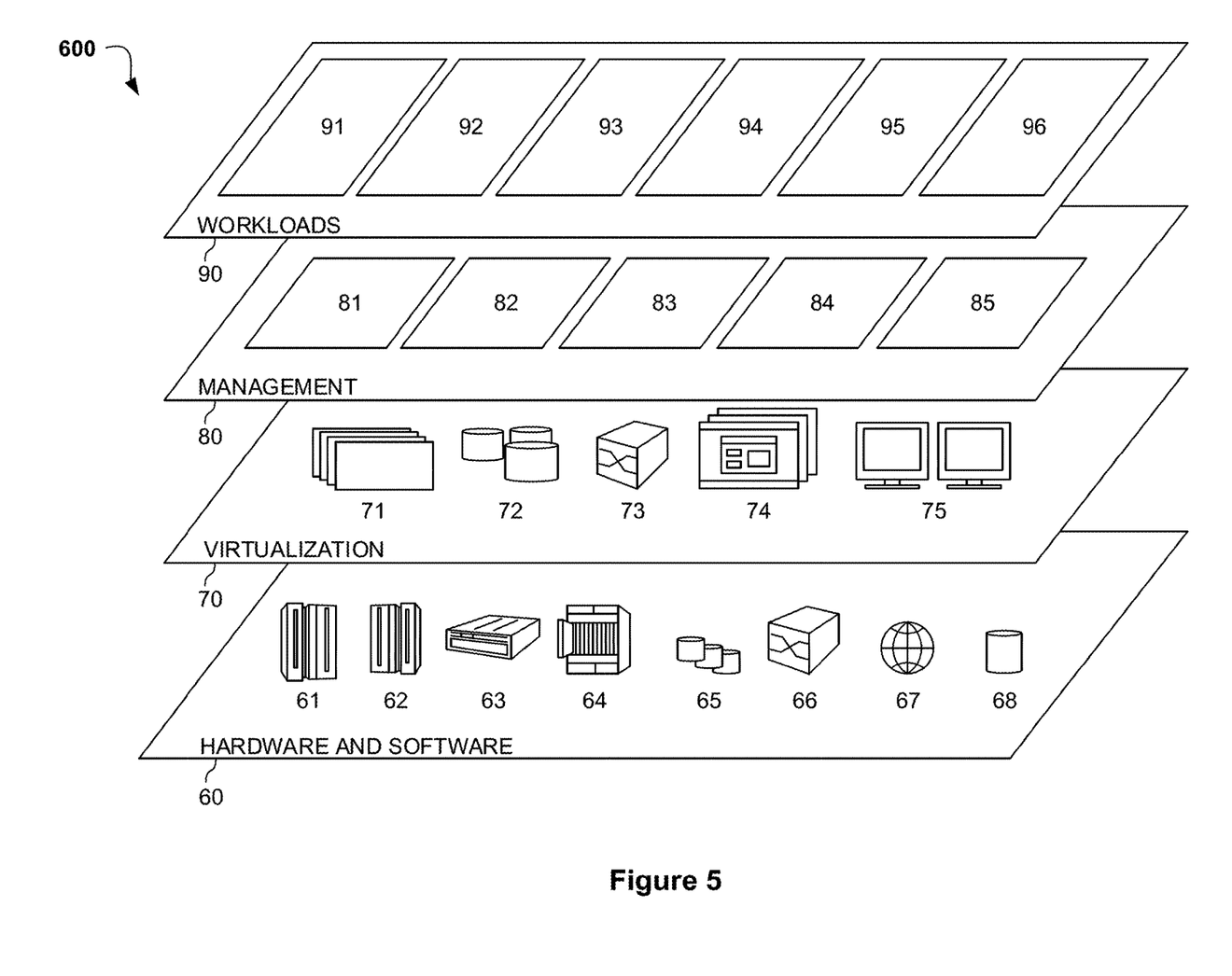
FIG. 5 depicts abstraction model layers according to an embodiment of the present invention.

Referring now to FIG. 5, a set of functional abstraction layers 600 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and object detection 96. Object detection 96 may relate to detecting classes of objects in digital photos while utilizing information of areas of high and low probability of object appearance.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of object detection, the method comprising:
   receiving an annotated image dataset comprising rectangles which surround objects to be detected and labels which specify a class to which an object belongs;
   calculating areas of high and low probability of rectangle distribution for each class of objects within images of the dataset;
   applying a correction factor to confidence values of object prediction results, obtained during validation of a trained object detection (OD) model, depending on a class label and a rectangle location of an object prediction result;
   calculating an accuracy of the trained OD model;
   increasing the correction factor and re-calculating the accuracy of the trained OD model with every increase; and
   selecting an optimal correction factor which yields a highest accuracy.

2. The method of claim 1, further comprising:
   dividing the annotated image dataset into a training portion digital images and a validation portion of digital images;
   training the OD model, by a number of iterations, using the training portion of digital images; and
   validating the trained OD model using the validation portion of digital images.

3. The method of claim 2, wherein dividing the annotated image dataset into a training portion of digital images and a validation portion of digital images is according to a user specified division ratio.

4. The method of claim 1, wherein calculating the areas of high and low probability of rectangle distribution for each class of objects comprises:
   analyzing rectangle location and distribution within an image of the dataset;
   identifying an area within the image having a top k percentage of center position pixel coordinates of rectangles; and
   identifying an area within the imaging having a bottom k percentage of center position pixel coordinates of rectangles.

5. The method of claim 1, wherein applying the correction factor to confidence values of object prediction results, obtained during validation of a trained OD model, depending on a class label and a rectangle location of an object prediction result comprises:
   multiplying a confidence value of the object prediction result by the correction factor in response to identifying that the rectangle location of the object prediction result comprises a center position pixel coordinate within the area of high probability of rectangle distribution for the class; and
   multiplying a confidence value of the object prediction result by a reciprocal value of the correction factor in response to identifying that the rectangle location of the object prediction result comprises a center position pixel coordinate within the area of low probability of rectangle distribution for the class.

6. The method of claim 1, wherein calculating an accuracy of the trained OD model comprises calculating a weighed F-value which evaluates a precision accuracy index and a recall accuracy index of the trained OD model in conjunction with a user defined weight parameter.

7. The method of claim 1, wherein the correction factor is increased along a pre-defined range and via pre-defined increments until the correction factor has exceeded the pre-defined range.

8. A computer system, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   receiving an annotated image dataset comprising rectangles which surround objects to be detected and labels which specify a class to which an object belongs;
   calculating areas of high and low probability of rectangle distribution for each class of objects within images of the dataset;
   applying a correction factor to confidence values of object prediction results, obtained during validation of a trained object detection (OD) model, depending on a class label and a rectangle location of an object prediction result;
   calculating an accuracy of the trained OD model;
   increasing the correction factor and re-calculating the accuracy of the trained OD model with every increase; and
   selecting an optimal correction factor which yields a highest accuracy.

9. The computer system of claim 8, further comprising:
   dividing the annotated image dataset into a training portion digital images and a validation portion of digital images;
   training the OD model, by a number of iterations, using the training portion of digital images; and
   validating the trained OD model using the validation portion of digital images.

10. The computer system of claim 8, wherein calculating the areas of high and low probability of rectangle distribution for each class of objects comprises:
    analyzing rectangle location and distribution within an image of the dataset;
    identifying an area within the image having a top k percentage of center position pixel coordinates of rectangles; and
    identifying an area within the imaging having a bottom k percentage of center position pixel coordinates of rectangles.

11. The computer system of claim 8, wherein applying the correction factor to confidence values of object prediction results, obtained during validation of a trained OD model, depending on a class label and a rectangle location of an object prediction result comprises:
    multiplying a confidence value of the object prediction result by the correction factor in response to identifying that the rectangle location of the object prediction result comprises a center position pixel coordinate within the area of high probability of rectangle distribution for the class; and multiplying a confidence value of the object prediction result by a reciprocal value of the correction factor in response to identifying that the rectangle location of the object prediction result comprises a center position pixel coordinate within the area of low probability of rectangle distribution for the class.

12. The computer system of claim 8, wherein calculating an accuracy of the trained OD model comprises calculating a weighed F-value which evaluates a precision accuracy index and a recall accuracy index of the trained OD model in conjunction with a user defined weight parameter.

13. The computer system of claim 8, wherein the correction factor is increased along a pre-defined range and via pre-defined increments until the correction factor has exceeded the pre-defined range.

14. The computer system of claim 8, wherein dividing the annotated image dataset into a training portion of digital images and a validation portion of digital images is according to a user specified division ratio.

15. A computer program product, the computer program product comprising:
one or more computer-readable tangible storage medium and program instructions stored on at least one of the one or more tangible storage medium, the program instructions executable by a processor capable of performing a method, the method comprising:
receiving an annotated image dataset comprising rectangles which surround objects to be detected and labels which specify a class to which an object belongs;
calculating areas of high and low probability of rectangle distribution for each class of objects within images of the dataset;
applying a correction factor to confidence values of object prediction results, obtained during validation of a trained object detection (OD) model, depending on a class label and a rectangle location of an object prediction result;
calculating an accuracy of the trained OD model;
increasing the correction factor and re-calculating the accuracy of the trained OD model with every increase; and
selecting an optimal correction factor which yields a highest accuracy.

16. The computer program product of claim 15, further comprising:
dividing the annotated image dataset into a training portion digital images and a validation portion of digital images;
training the OD model, by a number of iterations, using the training portion of digital images; and
validating the trained OD model using the validation portion of digital images.

17. The computer program product of claim 15, wherein calculating the areas of high and low probability of rectangle distribution for each class of objects comprises:
analyzing rectangle location and distribution within an image of the dataset;
identifying an area within the image having a top k percentage of center position pixel coordinates of rectangles; and
identifying an area within the imaging having a bottom k percentage of center position pixel coordinates of rectangles.

18. The computer program product of claim 15, wherein applying the correction factor to confidence values of object prediction results, obtained during validation of a trained OD model, depending on a class label and a rectangle location of an object prediction result comprises:
multiplying a confidence value of the object prediction result by the correction factor in response to identifying that the rectangle location of the object prediction result comprises a center position pixel coordinate within the area of high probability of rectangle distribution for the class; and
multiplying a confidence value of the object prediction result by a reciprocal value of the correction factor in response to identifying that the rectangle location of the object prediction result comprises a center position pixel coordinate within the area of low probability of rectangle distribution for the class.

19. The computer program product of claim 15, wherein calculating an accuracy of the trained OD model comprises calculating a weighed F-value which evaluates a precision accuracy index and a recall accuracy index of the trained OD model in conjunction with a user defined weight parameter.

20. The computer program product of claim 15, wherein the correction factor is increased along a pre-defined range and via pre-defined increments until the correction factor has exceeded the pre-defined range.

* * * * *